(12) United States Patent
Töpfer

(10) Patent No.: US 11,161,188 B2
(45) Date of Patent: Nov. 2, 2021

(54) METHOD AND APPARATUS FOR DEBURRING GEAR WHEELS

(71) Applicant: Klingelnberg GmbH, Hückeswagen (DE)

(72) Inventor: Gary Töpfer, Remscheid (DE)

(73) Assignee: Klingelnberg GmbH

( * ) Notice: Subject to any disclaimer, the term of this patent is extended or adjusted under 35 U.S.C. 154(b) by 310 days.

(21) Appl. No.: 16/380,549

(22) Filed: Apr. 10, 2019

(65) Prior Publication Data

US 2019/0314912 A1    Oct. 17, 2019

(30) Foreign Application Priority Data

Apr. 11, 2018   (DE) .......................... 102018108635.0

(51) Int. Cl.
    *B23F 19/10*   (2006.01)
(52) U.S. Cl.
    CPC ................. *B23F 19/108* (2013.01)
(58) Field of Classification Search
    CPC ........ B23P 15/14; B23F 19/108; B23F 19/00; B23F 19/10; B23F 23/00; B24B 29/02; B24B 9/00
    See application file for complete search history.

(56) References Cited

U.S. PATENT DOCUMENTS

| 3,064,290 A | 11/1962 | Bleke |
| 4,646,479 A * | 3/1987 | Walker ...................... B24B 9/00 451/124 |
| 2017/0261068 A1 * | 9/2017 | Zhao ......................... B24C 1/10 |

FOREIGN PATENT DOCUMENTS

| DE | 9112792 U1 | 5/1992 |
| DE | 202008008212 U1 | 10/2008 |
| DE | 102016117962 A1 | 3/2018 |
| EP | 3299105 A1 | 3/2018 |
| EP | 3517235 A1 | 7/2019 |

OTHER PUBLICATIONS

International Search Report issued in European Patent Application No. EP 19166691, dated Aug. 22, 2019, 2 pages.

* cited by examiner

*Primary Examiner* — Christopher J Besler
(74) *Attorney, Agent, or Firm* — McCarter & English, LLP

(57) ABSTRACT

Method for deburring gear wheels, for example, bevel gears, using a deburring brush, comprising at least N=1 brush bundles, having the following steps:
  rotationally driving the deburring brush about a spindle axis,
  rotationally driving a gear wheel or a bevel gear about a workpiece spindle axis, wherein
  the rotational driving of the deburring brush and the rotational driving of the gear wheel or the bevel gear take place in a coupled manner at a coupling transmission ratio,
  the method is a continuous method in which the at least N=1 brush bundle executes a relative flight movement in relation to the gear wheel or the bevel gear,
  the relative flight movement is defined by a hypocycloid or an epicycloid, and wherein
  a burr is removed at least on one tooth edge of a tooth gap by a contact of the at least N=1 brush bundle with the tooth edge.

13 Claims, 5 Drawing Sheets

METHOD AND APPARATUS FOR DEBURRING GEAR WHEELS

CROSS-REFERENCE TO RELATED APPLICATIONS

This application claims priority under 35 U.S.C. §§ 119(a)(d) to German patent application no. DE 10 2018 108 635.0 filed Apr. 11, 2018, which is hereby expressly incorporated by reference as part of the present disclosure.

FIELD OF THE INVENTION

The present disclosure relates to a method for deburring brushing of gear wheels, for example, bevel gears, and a CNC machine which is equipped with corresponding software for deburring brushing.

BACKGROUND

In the manufacturing of bevel gears, a burr (also referred to as a primary burr here) can arise at tooth edges due to the cutting machining. Because of the risk of injury, but also because of the risk of complete hardening when hardening the bevel gears, these tooth edges are frequently broken by a chamfer in the scope of chamfering/deburring.

In the mentioned deburring, depending on the constellation, a secondary burr can result upon removal of the primary burr due to the chamfering on the tooth edges. If the primary deburring is performed using a deburring tool, the cutting edge(s) of which are guided outward coming out of the tooth gap (the movement direction is symbolized in FIG. 1A by the arrow P1), the secondary burr 21 thus results outside the tooth gap 14, as shown in FIG. 1A. In contrast, if the deburring tool is guided into a tooth gap 14 during the primary deburring (the movement direction is symbolized by the arrow P2 in FIG. 1B), the secondary burr 21 thus results in the functional region of the bevel gear 10.

In mass production, the primary deburring is therefore carried out in most cases from the inside to the outside, as symbolized in FIG. 1A by the block arrow P1.

A primary burr primarily occurs at the tooth edge 11.1 of the concave flank 16.r, as schematically shown in FIG. 1A, since this flank 16.r generally forms a relatively acute angle in the region of the heel Fe with the rear face 17 of the bevel gear 10. FIG. 1A shows the state after the chamfering of the tooth edge 11.1. A chamfer 12 was produced by the chamfering and the primary burr was removed. However, secondary burr 21 has occurred simultaneously, as schematically indicated.

The situation after the chamfering of the tooth edge 11.1 from the outside to the inside is shown by way of example in FIG. 1B on the basis of the bevel gear 10. The profile of the chamfer 12 can be schematically seen in FIG. 1B. As can also be seen in FIG. 1B, along the first chamfer 12 a secondary burr 21 has formed, which is in the functional region of the bevel gear 10 in this case, however.

However, secondary burr 21 does not always occur. Relationships have been shown here, inter alia, with the quality of the cutting edges of the deburring tool. As long as the deburring tool has sharp cutting edges, the primary deburring runs relatively reliably. As cutting edges become blunter, the material of the bevel gear 10 is no longer cut, but rather displaced. In this case, the tendency toward forming secondary burr 21 increases. Since the tooth edges 11.1, 11.2 of the bevel gear teeth 15.r, 15.1 typically do not have a linear profile, for example, in the region of the heel Fe of the bevel gear 10, the thickness of the chips to be removed during the deburring varies. Secondary burrs 21 can sometimes also arise for this reason.

Deburring brushes are sometimes used, which are used either manually or in a machine to remove possible burr. A deburring brush for machine use has either plastic or metal bristles. Since the machine deburring brushing is usually carried out at great speed and sometimes large forces occur on the plastic or metal bristles, if they encounter a tooth, the brushes tend to bend or break off. Therefore, such deburring brushes have to be replaced relatively frequently to ensure reliable removal of burrs.

The need exists to deburr bevel gears reliably and safely using brushes. Especially in the mass production of bevel gears—for example in automobile construction—the problems which result in conjunction with the use of deburring brushes have to be avoided.

On the other hand, the need exists to make the deburring more efficient.

SUMMARY

It is therefore an object to provide a method for deburring brushing of bevel gears and a CNC-controlled machine having corresponding software, so that the deburring brushing can be carried out with little effort and as efficiently as possible, without destroying the deburring brush.

In at least some embodiments, a deburring brush is used which comprises at least N=1 brush bundles. Each of these at least N=1 brush bundles spans an angle range which is less than 360°. The method comprises the following steps:
rotationally driving the deburring brush about a (deburring) spindle axis,
rotationally driving a gear wheel or a bevel gear, respectively, about a workpiece spindle axis,
wherein
the rotational driving of the deburring brush and the rotational driving of the gear wheel or the bevel gear, respectively, takes place in a coupled manner at a specified coupling transmission ratio,
it is a continuous method for deburring brushing,
the deburring brush executes a relative flight movement in relation to the gear wheel or the bevel gear, respectively,
the relative flight movement is defined by a hypocycloid or an epicycloid, and wherein
a burr is removed at least on one tooth edge of a tooth gap by a contact of the at least N=1 brush bundles with the tooth edge.

In at least some embodiments, a CNC machine comprises at least four NC (numeric control) axes and a workpiece spindle having workpiece spindle axis for accommodating and rotationally driving a gear wheel workpiece, for example, a bevel gear workpiece, and a deburring device, which has a spindle axis for accommodating and rotationally driving a deburring brush, wherein the workpiece spindle axis and the spindle axis are NC axes which can be electronically coupled to one another.

In at least a part of the embodiments, the deburring brush has N=1 brush bundles and N=1 intermediate spaces.

In at least a part of the embodiments, the deburring brush has N=1 brush bundles and N=1 spacers.

In at least a part of the embodiments, the relative flight movement of the at least N=1 brush bundle leads into a tooth gap of the gear wheel or the bevel gear, respectively, i.e., the deburring is carried out by a relative flight movement from the outside to the inside.

In at least a part of the embodiments, the at least one N=1 brush bundle executes a relative flight movement in relation to the gear wheel or in relation to the bevel gear, respectively, having a movement direction which leads out of the tooth gap.

In at least a part of the embodiments, a hypocycloid coupling having inverse coupling transmission ratio is used. Such a hypocycloid coupling has the advantage that the flight movement of the at least N=1 brush bundle has a significant twist. I.e., the deburring is carried out so that the at least N=1 brush bundle moves after the deburring on a steep flight path out of the (collision) region of the gear wheel or the bevel gear, respectively.

In at least a part of the embodiments, an epicycloid coupling having positive coupling transmission ratio is used.

In at least a part of the embodiments, a coupling having a coupling transmission ratio is used which results from the number of teeth of the bevel gear and the number N of the brush bundles of the deburring brush (where N=1, 2, 3, 4 etc.).

In at least some embodiments, the deburring brushing is carried out after the gear wheel or the bevel gear, respectively, has been machined by milling, grinding, broaching, peeling, chamfering, or another chip-removing method.

In some embodiments, a CNC machine (for example, a bevel gear cutting machine or a dedicated deburring machine) having a deburring device having a deburring spindle and having software module, which is programmed accordingly, is used for the deburring brushing.

In embodiments having coupled rotational movement of the deburring brush and gear wheel or bevel gear, respectively, the N brush bundles are guided in a targeted and controlled manner through the tooth gaps, without colliding in an uncontrolled manner with the teeth of the gear wheel or the bevel gear, respectively.

In at least some embodiments, nearly arbitrarily-shaped profile edges of gear wheels, including bevel gears, are achievable by the brush bundle/s using the axes (NC axes) numerically controllable by a software module and a CNC controller of a CNC-controlled machine (for example, a bevel gear cutting machine or a dedicated deburring machine). Therefore, even with a strongly curved profile edge, deburring can be performed without mechanically straining the deburring brush excessively strongly.

BRIEF DESCRIPTION OF THE DRAWINGS

Other advantages and features will become apparent from the following detailed description, which are to be understood not to be limiting, and are described in more detail below with reference to the drawings.

DETAILED DESCRIPTION

Figure 1A:
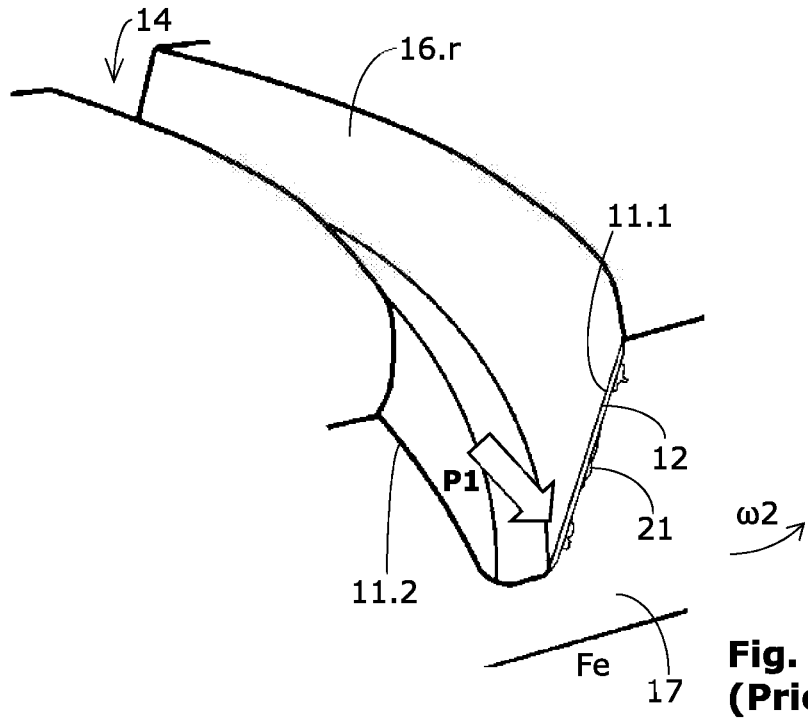
FIG. 1A schematically shows a perspective view of a bevel gear (a crown wheel here), wherein a single tooth gap is indicated, at the tooth edge of which a chamfer was generated by chamfering from the inside to the outside, wherein a secondary burr has formed in the region of the chamfer.
Figure 1B:
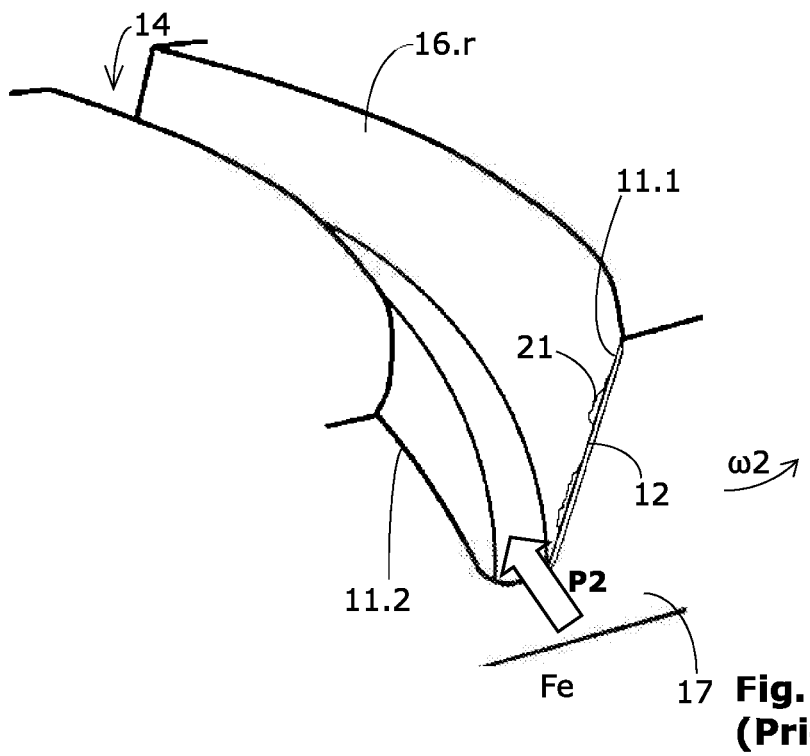
FIG. 1B schematically shows a perspective view of a bevel gear (a crown wheel here), wherein a single tooth gap is indicated, at the tooth edge of which a chamfer was generated by chamfering from the outside to the inside, wherein a secondary burr has formed in the region of the chamfer.

FIGS. 1A and 1B, which were already described at the outset, show schematic perspective views of a bevel gear 10, wherein exemplary steps of two conventional deburring methods have been explained on the basis of these two figures. The elements and terms which are used herein were also defined on the basis of FIGS. 1A and 1B.

Figure 2A:
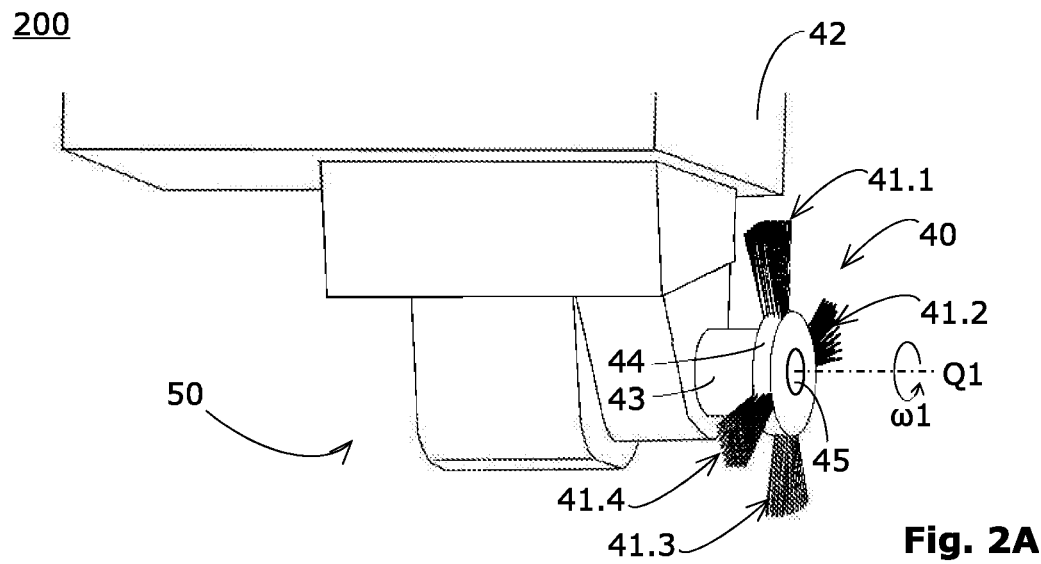
FIG. 2A schematically shows a perspective view of a region of a CNC-controlled machine, which has an N=4 deburring brush.

FIG. 2A shows a schematic perspective view of a part of a CNC-controlled machine 200, which comprises an embodiment of a deburring device 50. The deburring device 50 shown is arranged in a hanging constellation on a movable part 42 of the machine 200. The deburring device 50 comprises a (deburring) spindle 43, the (deburring) spindle axis of which is provided with the reference sign Q1. This (deburring) spindle axis Q1 extends horizontally in the example shown. A deburring brush 40 having N=4 brush bundles 41.1, 41.2, 41.3, 41.4 is fastened on the (deburring) spindle 43.

The deburring brush 40 comprises, in at least a part of the embodiments, a central plate-shaped or disk-shaped main body 44. The main body 44 can have, for example, a central passage borehole 45, which is designed to plug the deburring brush 40 onto a shaft of the (deburring) spindle 43. The passage borehole 45 is shown in FIG. 2A, however, the actual fastening means were omitted, since there are numerous different fastening options which can be used here.

Figure 2B:
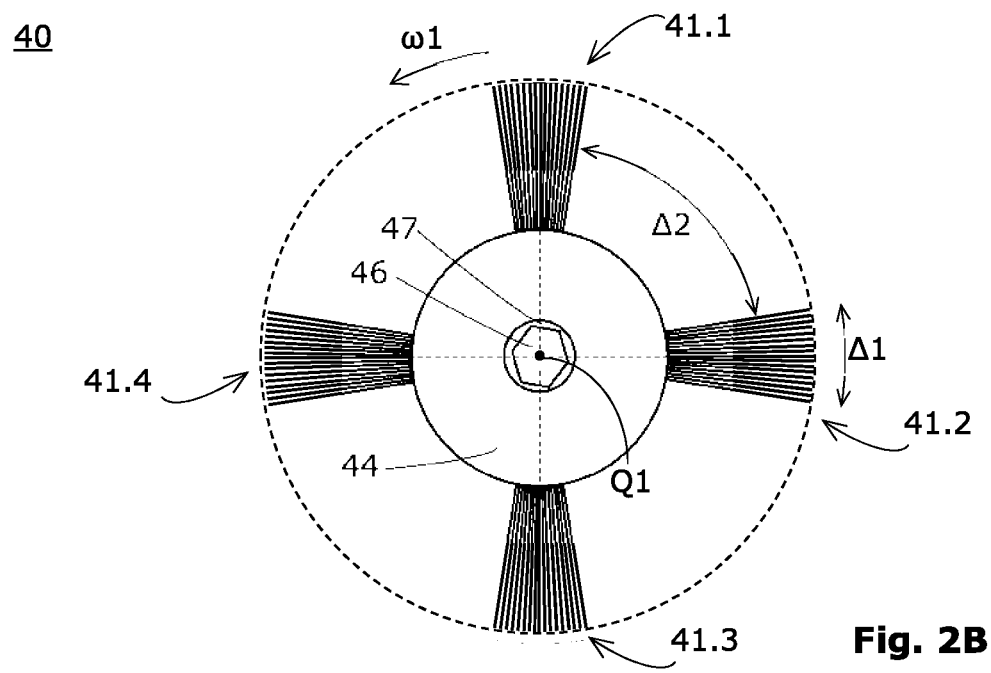
FIG. 2B schematically shows a front view of an N=4 deburring brush.

An exemplary embodiment is shown in FIG. 2B, in which a screw 46 and a washer 47 can be seen, wherein the screw 46 was screwed into an internal thread of a shaft of the (deburring) spindle 43.

The main body 44 has, in at least a part of the embodiments, a rotationally-symmetrical shape (the shape of a thin cylinder here), on the enveloping surface of which, facing radially outward, bristles are arranged in groups or bundles. The number N is used here to define the number of the brush bundles 41.N of a deburring brush 40. N is a whole number greater than or equal to 1, i.e., N=1, 2, 3, 4, etc.

Each of the N=4 brush bundles 41.N spans an angle range $\Delta1$, which is less than 360°, in the embodiment of FIG. 2B. In the example shown, the angle range $\Delta1$ can be computed as follows:

$$\Delta 1=[360°-(N*\Delta 2)]/N$$

Specifically, in the embodiment of FIG. 2B: $\Delta2\approx70°$ and $\Delta2\approx20°$.

The brush bundles 41.N are distinguished in that they are arranged equidistantly to one another along the circumference of the main body 44. If a single brush bundle 41.1 covers an angle range $\Delta1$ of, for example, 10°, the other brush bundles 41.2, 41.3, and 41.4 then also cover an identical angle range of 10° each. The mutual angle spacing $\Delta2$ of two successive brush bundles is then 80° in each case.

Since the present method for deburring brushing is a continuous method, maintaining the angle allocation (as shown, for example, on the basis of FIGS. 2B and 3A) is important. This is because in the continuous method presented here, the deburring brush 40 and the bevel gear workpiece 10 to be deburred are rotationally driven in a coupled manner. This coupling results from the number of teeth or the number of the tooth gaps 14, respectively, of the bevel gear workpiece 10 and the number N of the brush bundles 41.N.

An electronic coupling may be used in at least some embodiments.

The coupling can also be defined by the ratio of the radius of the rolling circle to the radius of the base circle.

If the deburring brush 40 comprises, for example, N=1 brush bundles 41.1 and the bevel gear workpiece 10 having ten tooth gaps 14 rotates at the angular velocity $\omega 2$ about the workpiece spindle axis B, the angular velocity $\omega 1$ of the deburring brush 40 then has to be ten times as great as the angular velocity $\omega 2$, if the brush bundles 41.N are to be guided in direct succession through a first, a second, a third tooth gap 14, etc. The coupling transmission ratio Ü is in this case Ü=10.

However, other coupling transmission ratios Ü are also possible, wherein then the bevel gear workpiece 10 has to make two or more than two complete revolutions until the tooth edges of all tooth gaps 14 have been deburred using the N=1 brush bundle 41.1. The transmission ratio Ü does not have to be a whole number and it can be greater than zero (positive coupling) or less than zero (inverse coupling).

If the deburring brush 40 comprises more than only one brush bundle 41.1, i.e., if N>1, the angular velocity $\omega 1$ of the deburring brush 40 can thus be reduced. If, for example, N=2 brush bundles 41.1, 41.2 are used and if the first brush bundle 41.1 is to be guided through a first tooth gap, the second brush bundle 41.2 through an immediately adjoining second tooth gap 14, the first brush bundle 41.1 through an immediately adjoining third tooth gap 14, etc., the coupling transmission ratio Ü is thus in this case Ü=5.

In at least a part of the embodiments, an inverse coupling transmission ratio is used and the track (also referred to as the flight path here), which a brush bundle 41.N of a deburring brush 40 describes in three-dimensional space in relation to the bevel gear workpiece 10, follows a hypocycloid.

In at least a part of the embodiments, a positive coupling transmission ratio is used and the flight path, which a brush bundle 41.N of a deburring brush 40 describes in three-dimensional space in relation to the bevel gear workpiece 10, follows an epicycloid.

The inverse coupling transmission ratio is selected in a part of the embodiments so that a first brush bundle 41.1 of the deburring brush 40 is moved, for example, from the outside to the inside through a first tooth gap 14 of the bevel gear 10. A second brush bundle 41.1 of the deburring brush 40 is moved from the outside to the inside, for example, through the next tooth gap 14 of the bevel gear 10, etc.

In at least a part of the embodiments, the brush bundles 41.N are on a circle on the circumference of the deburring brush 40.

To be able to better illustrate the movement sequences and the relationships, the rotational directions of the deburring brush 40 and of the bevel gear 10 are indicated by the curved arrows $\omega 1$ and $\omega 2$.

The relative orientation of the two rotational directions $\omega 1$ and $\omega 2$ is referred to here as inverse coupling if the rotational direction $\omega 2$ leads away in relation to the rotational direction $\omega 1$.

If, for example, in FIG. 1B, the deburring brushing is performed using an inverse coupling of the two rotational directions $\omega 1$ and $\omega 2$, the brush bundles 41.N move in the direction of the arrow P2, while the bevel gear 10 rotates away counterclockwise, as indicated by the curved arrow $\omega 2$ in FIG. 1B.

It is an advantage of inverse coupling that in the case of trailing of the deburring brush 40, the bristles of the deburring brush 40 do not collide excessively strongly with the material/the teeth of the bevel gear 10. In other words, should a brush bundle 41.N, which is moved in the direction of the arrow P2 in the direction of a tooth gap 14, arrive too late, because the coupling transmission ratio Ü should have been shifted (for example, because of a force action on one of the drives), the edge 11.1 of the bevel gear 10 has thus already rotated away slightly.

If a procedure for deburring brushing from the inside to the outside having inverse coupling is selected, the brush bundles 41.N are thus guided outward out of the tooth gap 14 along a hypocycloid flight path. If one also maintains the movement direction $\omega 2$ of FIG. 1B in FIG. 1A, the movement direction $\omega 1$ has to be reversed to still achieve an inverse coupling. In this case, the arrow P1 therefore points out of the tooth gap 14.

If a positive coupling is desired, the movement direction $\omega 2$, for example, has to be reversed in FIG. 1A or in FIG. 1B.

Since a fixed coupling transmission ratio Ü is used in the present method, it is important for the brush bundles 41.N of the deburring brush 40 to be as dimensionally stable as possible. If the bristles of the brush bundles 41.N bend due to excessively strong strain, trailing of the brush bundles 41.N can occur, so to say.

In the case of inverse coupling, the trailing of the (deburring) spindle axis Q1 in relation to the workpiece spindle axis B does not represent a large problem, since the tooth edge to be deburred (for example, the tooth edge 11.1 in FIG. 1B) leads away. In the case of trailing of the brush bundles 41.N due to bending of the bristles, a method having inverse coupling is correspondingly advantageous, since the tooth edge to be deburred (for example, the tooth edge 11.1 in FIG. 1B) also leads away here and thus excessively strong collisions are avoided.

In the case of positive coupling, in contrast, a more significant collision of the brush bundles 41.N with the teeth of the bevel gear workpiece 10 occurs upon trailing of the (deburring) spindle axis Q1 and/or upon trailing of the brush bundles 41.N, since the tooth edge to be deburred runs into the brush bundle 41.N (in the illustration of FIG. 1B, the movement direction $\omega 2$ has to be reversed if a positive coupling is desired).

Figure 3A:
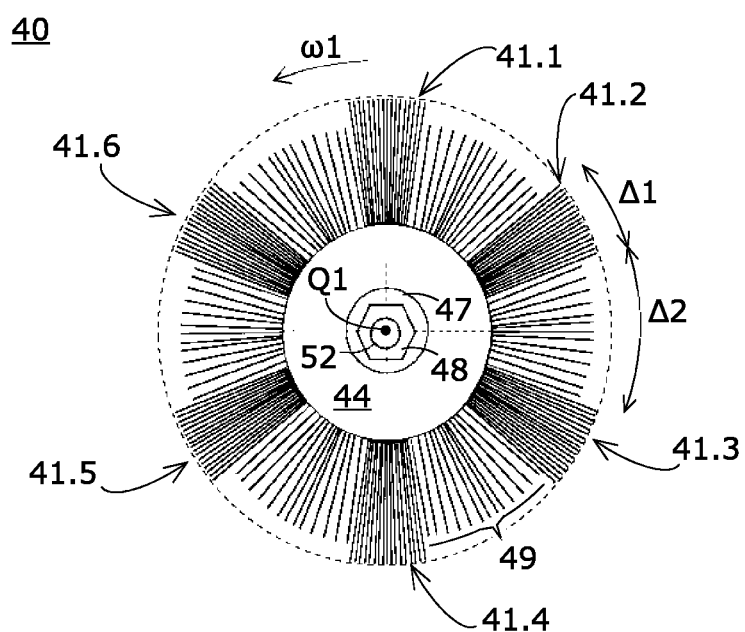
FIG. 3A schematically shows a front view of an N=6 deburring brush.

To avoid problems with bending bristles, in at least a part of the embodiments, deburring brushes 40 are used in which the intermediate spaces or angle segments between the brush bundles 41.N are occupied, for example, by short, significantly more stable bristles, lobes, plates, or other spacers 49, as shown on the basis of an example in FIG. 3A. The deburring brush 40 of FIG. 3A comprises N=6 brush bundles 41.1, 41.2, 41.3, 41.4, 41.5, 41.6, which have a mutual angle spacing $\Delta 2$ of approximately 40°. Each of the brush bundles 41.N covers an angle range $\Delta 1$ of approximately 10° here. The intermediate spaces or angle segments each have an angle $\Delta 2$ of approximately 40°, i.e., the spacers 40 cover approximately an angle range of approximately 40°.

In contrast to FIG. 2B, a washer 47 and a nut 48 are used in FIG. 3A, wherein the nut was screwed onto the outer thread of a threaded pin 52.

Figure 3B:
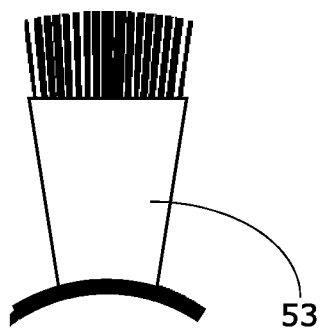
FIG. 3B schematically shows a front view of a brush bundle of a deburring brush.

To avoid problems with bending bristles, in at least a part of the embodiments, deburring brushes 40 are used in which the brush bundles 41.N are provided with a collar or jacket 53, as shown in FIG. 3B on the basis of a single brush bundle 41.N. The collar or jacket 53 prevents premature bending of the bristles.

Figure 4:
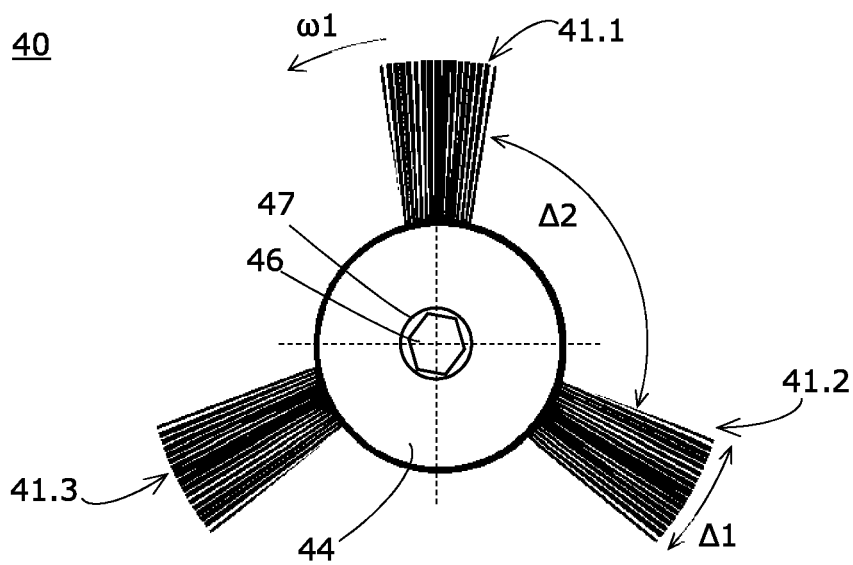
FIG. 4 schematically shows a front view of an N=3 deburring brush.

To avoid problems with bending bristles, in at least a part of the embodiments, deburring brushes 40 are used, the brush bundles 41.N of which have relatively short bristles, as shown on the basis of an example in FIG. 4. The deburring brush 40 of FIG. 4 comprises N=3 brush bundles 41.1, 41.2, 41.3, which have a mutual angle spacing Δ2 of approximately 110°. Each of the brush bundles 41.N covers an angle range Δ1 of approximately 10° here.

Figure 5:
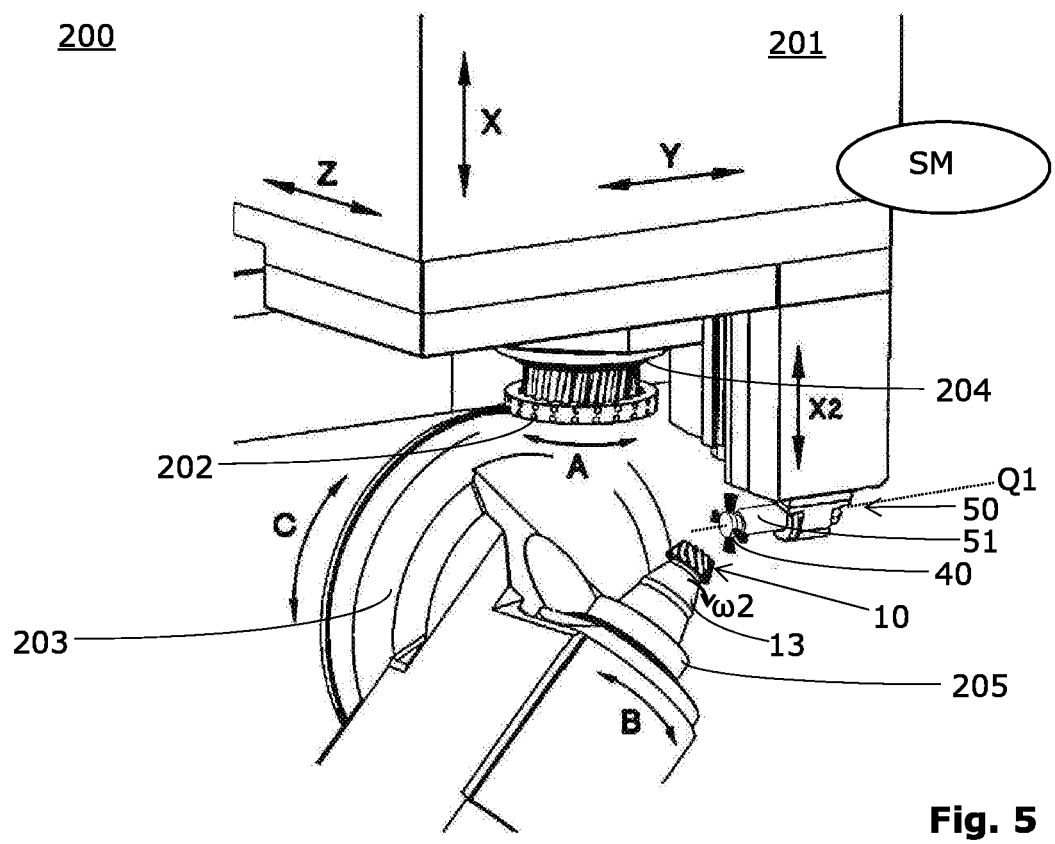
FIG. 5 schematically shows a perspective partial view of a gear cutting machine having a deburring device and a deburring brush.

In a CNC gear cutting machine 200, as shown in FIG. 5, the required relative movements are generated, for example, in that the center point of the rolling circle is fixed in space, while the base circle rotates. The rolling circle rolls in the interior of the base circle to generate a hypocycloid in relation to the rotating bevel gear 10. If the rolling circle rolls on the outside of the base circle, an epicycloid is thus generated in relation to the rotating bevel gear 10.

In at least a part of the embodiments, the CNC machine 200 is designed or programmed by means of software SM so that either an inverse coupling or a positive (non-inverse) coupling can be specified for the deburring brushes.

The coupling transmission ratio is selected so that a brief contact occurs between the deburring brush 40 and the bevel gear 10 in each case only in the region of the tooth edges to be deburred (11.1 or 11.2). The coupling transmission ratio Ü is defined by the ratio of the two radii of the base circle and the rolling circle.

FIG. 5 shows a perspective illustration of the basic structure of a CNC gear cutting machine 200, which is designed for the gear cutting and the deburring brushing of bevel gears 10. Such a machine 200 may be designed or refitted so that the deburring brushing of the bevel gear 10 can be performed by means of a deburring device 50, which carries a deburring brush 40 on a deburring spindle 51. A deburring brush 40 having N=4 brush bundles 41.N is used here (similarly as shown in FIG. 2A or 2B).

However, the principle presented herein may also be applied in other CNC gear cutting machines 200 or in deburring machines which are equipped with a deburring device 50 as shown, for example, in FIG. 2A or in FIG. 5.

The CNC gear cutting machine 200 can be constructed as follows. The machine 200 can comprise a machine housing 201, which enables it to guide a tool spindle 204 linearly vertically along a coordinate axis X (first axis), linearly horizontally along a coordinate axis Y (second axis), and linearly horizontally along a coordinate axis Z (third axis). The mentioned tool spindle 204 can be arranged hanging on the machine 200, for example, wherein the corresponding tool spindle axis A (fourth axis) hangs vertically in space. The tool spindle 204 carries a tool, by way of example a cutterhead 202 having multiple bar cutters here (the bar cutters are not visible).

A first pivot device 203 can be provided on the machine 200, for example, which carries a workpiece spindle 205 having a workpiece spindle axis B (fifth axis). The workpiece spindle 205 including workpiece spindle axis B can be pivoted about a pivot axis (C axis; sixth axis) of the first pivot device 203. The pivot axis C is perpendicular to the tool spindle axis A and extends horizontally in space here. If one looks from the front in the direction of the pivot axis C toward the machine 200 of FIG. 5, the workpiece spindle 205 stands diagonally in a 2 o'clock position at the moment shown. In this position, for example, a deburring brush 40 of the deburring device 50 can be caused to interact with the bevel gear workpiece 10.

The workpiece spindle 205 carries a helical-toothed bevel gear pinion as the workpiece 10 in the example shown. A clamping device 13 can be used for connecting the bevel gear 10 to the workpiece spindle 205.

The first pivot device 203 can be mounted so it is pivotable around the C axis, for example, so that the bevel gear 10 is pivotable into a machining position below the gear cutting tool 202. Moreover, the bevel gear 10 can be transferred by the first pivot device 203 for the deburring brushing into a suitable position in relation to the deburring brush 40 of the deburring device 50.

Moreover, the deburring device 50 can be provided, for example, with infeed device(s) to be able to move the deburring brush 40 in relation to the bevel gear 10 and be able to cause it to interact therewith.

The deburring device 50 presented herein, which comprises a deburring brush 40, can comprise, for example, a linear axis X2 (seventh axis) and a deburring spindle axis Q1 (eighth axis) as shown in FIG. 5. It is important that at least the deburring spindle axis Q1 is designed as a NC axis, the rotational movement ω1 of which can be electronically coupled to the rotational movement ω2 of the workpiece spindle axis B.

The machine 200 is designed so that in at least some embodiments, the bevel gear 10 and the deburring brush 40 can be rotationally driven either positively coupled or inversely coupled, wherein this coupling is defined by a coupling transmission ratio C.

In at least a part of the embodiments, the machine 200 is designed so that either a positive coupling or an inverse coupling can be selected. In this case, the machine 200 is designed to support both forms of coupling.

Using one or more of the mentioned axes, the deburring brush 40 can be moved in relation to the bevel gear 10 into a starting position suitable for the deburring brushing.

The bevel gear 10 is then rotationally driven about the workpiece spindle axis B and the deburring brush 40 is rotationally driven about the deburring spindle axis Q1 in a coupled manner and they are moved in relation to one another. In a continuous method, the bristles of the deburring brush 40 execute corresponding deburring movements from the outside to the inside or from the inside to the outside at the predetermined edges 11.1 and/or 11.2 of the bevel gear 10.

To be able to implement the deburring brushes in the continuous method, bevel gear cutting machines 200 having at least six numerically controlled axes may be used, as shown by way of example in FIG. 5.

However, other CNC bevel gear cutting machines 200 can also be refitted or equipped accordingly, wherein machines 200 having seven, eight, or nine numerically controlled axes may be used, as was already explained on the basis of FIG. 5.

The deburring device 50 may comprise in at least some embodiments a deburring spindle 51 having the above-mentioned deburring spindle axis Q1, which has a horizontal orientation in the example shown here. A deburring brush 40 can be fastened on the deburring spindle 51, as shown in FIG. 5. The deburring brush 40 shown in FIG. 5 is specifically a deburring brush 40, which is equipped with N=4 brush bundles 41.N so that they protrude radially out of the circumference of the deburring brush 40.

Numerically controllable axes in this context are axes which are controllable via a programmable controller. The numerically controllable axes are designed and arranged so that by way of the adjustment of at least one of the axes, the workpiece spindle 205 including the bevel gear 10 is movable in relation to the deburring brush 40 so that the brush bundles 41.N, during simultaneous coupled rotation of the workpiece spindle 205 about the workpiece spindle axis B and the deburring brush 40 about the deburring spindle axis Q1, successively execute a deburring movement in relation to the specified tooth edges 11.1, 11.2 of the bevel gear 10.

As indicated in FIG. 5, the deburring spindle axis Q1 of the deburring device 50 can extend, for example, parallel to the Y axis. Other axis constellations are possible, however.

According to at least some embodiments, one or more of the numerically controlled axes may be used in at least some embodiments to move the brush bundles 41.N of the tool 40 in relation to the workpiece 10.

Since the bevel gear 10 rotates at a specified first angular velocity ω2 about the workpiece axis B and the deburring brush 40 rotates at a second angular velocity ω1 about the deburring spindle axis Q1 and since the two rotational movements occur in the same or opposite directions in an (electronically) coupled manner, complex helical flight paths in three-dimensional space result for the brush bundles 41.N.

What is claimed is:

1. A method comprising the following steps:
    rotationally driving a deburring brush about a spindle axis, wherein the deburring brush comprises at least N=1 brush bundles, each of which define an angular range of less than 360°;
    rotationally driving a gear wheel about a workpiece spindle axis in a coupled manner with said rotationally driving the deburring brush using a coupling transmission ratio; and
    deburring in a continuous method the gear wheel using the deburring brush, including the steps of:
        executing a relative flight movement of the at least N=1 brush bundles relative to the gear wheel, wherein the relative flight movement is defined by a hypocycloid or an epicycloid; and
        removing a burr from at least one tooth edge of a tooth gap of the gear wheel by contacting the at least N=1 brush bundles with the at least one tooth edge;
    wherein the gear wheel defines a number of teeth which define a number of tooth gaps therebetween, and wherein the coupling transmission ration is defined by the number of teeth or the number of tooth gaps and the number of the at least N=1 brush bundles.

2. A method according to claim 1, wherein the executing step includes executing the relative flight movement of the at least N=1 brush bundles in a direction into the tooth gap or in a direction out of the tooth gap.

3. A method according to claim 1, wherein the coupling transmission ratio is defined by an inverse coupling transmission ratio and the relative flight movement is defined by a hypocycloid.

4. A method according to claim 1, wherein the coupling transmission ratio is defined by a positive coupling transmission ratio and the relative flight movement is defined by an epicycloid.

5. A method according to claim 1, including executing the relative flight movement so that the at least one tooth edge moves away relative to the at least N=1 brush bundles after the contacting step.

6. A method according to claim 1, wherein the coupling transmission ratio is selectable or specifiable before the rotationally driving steps.

7. A method according to claim 1, wherein the deburring brush has N=1 brush bundles and N=1 intermediate spaces.

8. A method according to claim 1, wherein the gear wheel defines a bevel gear.

9. A method according to claim 2, wherein the coupling transmission ratio is defined by an inverse coupling transmission ratio and the relative flight movement is defined by a hypocycloid.

10. A method according to claim 2, wherein the coupling transmission ratio is defined by a positive coupling transmission ratio and the relative flight movement is defined by an epicycloid.

11. A method according to claim 2, including executing the relative flight movement so that the at least one tooth edge moves away relative to the at least N=1 brush bundles after the contacting step.

12. A method according to claim 2, wherein the coupling transmission ratio is selectable or specifiable before the rotationally driving steps.

13. A method according to claim 2, wherein the deburring brush has N=1 brush bundles and N=1 intermediate spaces.

* * * * *